(12) United States Patent
Yang et al.

(10) Patent No.: US 11,641,611 B2
(45) Date of Patent: *May 2, 2023

(54) CONDITIONAL PACKETS FORWARD CONTROL RULES

(71) Applicant: Telefonaktiebolaget LM Ericsson (publ), Stockholm (SE)

(72) Inventors: Yong Yang, Kållered (SE); Stefan Rommer, Västra Frölunda (SE); Jan Backman, Kärna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/533,781

(22) Filed: Nov. 23, 2021

(65) Prior Publication Data

US 2022/0095196 A1 Mar. 24, 2022

Related U.S. Application Data

(63) Continuation of application No. 17/283,770, filed as application No. PCT/EP2019/077129 on Oct. 7, 2019, now Pat. No. 11,272,419.

(60) Provisional application No. 62/742,503, filed on Oct. 8, 2018.

(51) Int. Cl.
*H04W 40/02* (2009.01)
(52) U.S. Cl.
CPC ................................. *H04W 40/02* (2013.01)

(58) Field of Classification Search
None
See application file for complete search history.

(56) References Cited

U.S. PATENT DOCUMENTS

| | | | |
|---|---|---|---|
| 10,021,521 B1 * | 7/2018 | Reeves | H04W 4/023 |
| 10,511,669 B2 | 12/2019 | Bogineni et al. | |
| 11,272,419 B2 * | 3/2022 | Yang | H04L 67/63 |
| 2019/0053117 A1 | 2/2019 | Bae et al. | |
| 2019/0182385 A1 | 6/2019 | Yan et al. | |
| 2019/0191467 A1 | 6/2019 | Dao et al. | |

OTHER PUBLICATIONS

Author Unknown, "Technical Specification Group Services and System Aspects; Study on enhancement of EPC for low latency communication including device mobility (Release 16)," Technical Report 23.739, Version 1.0.0, 3GPP Organizational Partners, Jun. 2018, 27 pages.

Author Unknown, "Technical Specification Group Services and System Aspects; Study on Access Traffic Steering, Switching and Splitting support in the 5G system architecture (Release 16)," Technical Report 23.793, Version 1.0.0, 3GPP Organizational Partners, Sep. 2018, 93 pages.

(Continued)

*Primary Examiner* — Brian S Roberts
(74) *Attorney, Agent, or Firm* — Withrow & Terranova, PLLC

(57) ABSTRACT

Disclosed herein is a method for implementing conditional packet forwarding control rules, performed by User Plane Function (UPF). The method comprises: receiving, from a Control Plane Function (CPF) a packet forwarding control rule comprising one or more rule enforcement conditions; and applying the packet forwarding control rule according to the rule enforcement condition(s).

10 Claims, 10 Drawing Sheets

(56) References Cited

OTHER PUBLICATIONS

Author Unknown, "Technical Specification Group Core Network and Terminals; 5G System—Phase 1; CT WG4 Aspects (Release 15)," Technical Report 29.891, Version 1.1.0, 3GPP Organizational Partners, Oct. 2017, 151 pages.

Author Unknown, "Technical Specification Group Services and System Aspects; Policy and charging control architecture (Release 15)," Technical Specification 23.203, Version 15.4.0, 3GPP Organizational Partners, Sep. 2018, 262 pages.

Author Unknown, "Technical Specification Group Services and System Aspects; System Architecture for the 5G System (5GS); Stage 2 (Release 16)," Technical Specification 23.501, Version 16.2.0, 3GPP Organizational Partners, Sep. 2019, 391 pages.

Author Unknown, "Technical Specification Group Core Network and Terminals; Policy and Charging Control (PCC); Reference points (Release 15)," Technical Specification 29.212, Version 15.4.0, 3GPP Organizational Partners, Sep. 2018, 284 pages.

Author Unknown, "Technical Specification Group Core Network and Terminals; Interface between the Control Plane and the User Plane Nodes; Stage 3 (Release 15)," Technical Specification 29.244, Version 15.3.0, 3GPP Organizational Partners, Sep. 2018, 189 pages.

Author Unknown, "Technical Specification Group Core Network and Terminals; 5G System; Session Management Services; Stage 3 (Release 15)," Technical Specification 29.502, Version 0.2.0, 3GPP Organizational Partners, Oct. 2017, 21 pages.

Author Unknown, "Technical Specification Group Core Network and Terminals; 5G System; Network Function Repository Services; Stage 3 (Release 15)," Technical Specification 29.510, Version 0.2.0, 3GPP Organizational Partners, Oct. 2017, 20 pages.

Author Unknown, "Technical Specification Group Core Network and Terminals; 5G System; Access and Mobility Management Services; Stage 3 (Release 15)," Technical Specification 29.518, Version 0.2.0, 3GPP Organizational Partners, Oct. 2017, 46 pages.

Ericsson, "C4-185486: Essential clarification on the provision of several SDF filters in a PDF," Third Generation Partnership Project (3GPP), TSG CT WG4 Meeting #85bis, Jul. 9-13, 2018, 6 pages, Sophia Antipolis, France.

Huawei, "C4-175178: Update introduction section to 5GC," Third Generation Partnership Project (3GPP), TSG CT4 Meeting #80, Oct. 23-27, 2017, 5 pages, Kochi, India.

MediaTek Inc., et al., "S2-181471: Miscellaneous editorial corrections (capitalization, messages, procedures etc.)," Third Generation Partnership Project (3GPP), TSG-SA2 Meeting #125, Jan. 21-26, 2018, 3 pages, Gothenburg, Sweden.

Nokia, et al., "C4-172225: Pseudo-CR on Time of the Day procedures," Third Generation Partnership Project (3GPP), TSG CT4 Meeting #77, Apr. 3-7, 2017, 2 pages, Spokane, US.

SA WG2, "SP-170411: New SID: Study on Access Traffic Steering, Switch and Splitting support in the 5G system architecture," Third Generation Partnership Project (3GPP), TSG SA Meeting #76, Jun. 7-9, 2017, 4 pages, West Palm Beach, Florida, USA.

SA WG2, "SP-180732: Updated SID: Study on Access Traffic Steering, Switch and Splitting support in the 5G system architecture," Third Generation Partnership Project (3GPP), TSG SA Meeting #SP-81, Sep. 12-14, 2018, 4 pages, Gold Coast, Australia.

International Search Report and Written Opinion for International Patent Application No. PCT/EP2019/077129, dated Nov. 28, 2019, 12 pages.

International Preliminary Report on Patentability for International Patent Application No. PCT/EP2019/077129, dated Sep. 15, 2020, 15 pages.

Notice of Allowance for U.S. Appl. No. 17/283,770, dated Nov. 1, 2021, 8 pages.

Extended European Search Report for European Patent Application No. 21175358.7, dated Sep. 24, 2021, 10 pages.

* cited by examiner

*Alternative #1*

*Alternative #2*

*Alternative #3*

Alternative 2, Use Case 1

Alternative 2, Use Case 2

CONDITIONAL PACKETS FORWARD CONTROL RULES

This application is a continuation of U.S. patent application Ser. No. 17/283,770, filed Apr. 8, 2021, now U.S. Pat. No. 11,272,419, which is a 35 U.S.C. § 371 national phase filing of International Application No. PCT/EP2019/077129, filed Oct. 7, 2019, which claims the benefit of U.S. Provisional Application No. 62/742,503, filed Oct. 8, 2018, the disclosures of which are incorporated herein by reference in their entireties.

TECHNICAL FIELD

The present disclosure relates to implementation of conditional packet forwarding control rules, particularly packet forwarding control rules comprising one or more rule enforcement conditions.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

In the Evolved Packet Core (EPC) and Fifth Generation (5G) Core network (5GC), there is no mechanism by which separation of the control plane and user plane applies, such that a Control Plane Function (CPF) can provision the User Plane Function (UPF) with a set of rules with certain conditions such that the rule is only enforced according to the condition. Examples of a CPF include, but are not limited to, a Packet Data Network Gateway (PGW) control plane function (PGW-C) and a Session Management Function (SMF) and similar. Examples of a UPF include, but are not limited to, a Packet Data Network Gateway (PGW) user plane function (PGW-U) and a User Plane Function (UPF) and similar. Examples of a rule include, but are not limited to, a Packet Detection Rule (PDR) and a Forwarding Action Rule (FAR).

There is also a lack of support for a CPF to control aggregation technologies such as Multi-Path Transmission Control Protocol (MPTCP) where, for example, there is a need to control user-plane protocols above IP such as TCP.

A Third Generation Partnership Project (3GPP) Service and System Aspects (SA) Working Group 2 (hereinafter referred to as "SA2") Release 16 (Rel-16) Work Item SP-170411,[1] was recently revised to SP-180732.[2] The scope of the work is to study how a UE can connect to both 3GPP and non-3GPP accesses in the 5G system and how the 5G Core network and the 5G UE can support multi-access traffic steering, switching, or splitting (ATSSS) between 3GPP and non-3GPP accesses.

[1] 760052 (FS_ATSSS) "Study on Access Traffic Steering, Switch and Splitting support in the 5G system architecture" [Rel-16], www.3gpp.org/DynaReport/WiVsSpec—760052.htm
[2] www.3gpp.org/ftp/tsg_sa/TSG_SA/TSGS_81/Docs/SP-180732.zip Besides this work, per existing requirements, e.g., as specified in Technical Specification (TS) 23.203 and TS 29.212, a Policy and Charging Control (PCC) rule can be activated at certain time of a day. Such a PCC rule can be provisioned from a Policy Control Function (PCF) to the CPF (e.g., SMF and PGW-C) earlier. This is to prevent a signaling storm, as such activation at certain the time of day (e.g., at the border between non-busy-hour and busy-hour, or between weekday and weekend), is usually applicable to many UEs.

However, there is no protocol support in the Packet Forwarding Control Protocol (PFCP), which is a protocol used between the control plane and user plane function, since those PCC rules which are required to be activated at certain time often require that the CPF provision the corresponding Packet Forwarding Control Rules (PFCRs), e.g., PDRs, FARs, QoS Enforcement Rules (QERs) and Usage Reporting Rules (URRs). The following example illustrates this concept. The example PCC rule shown below includes certain parameters that can be mapped to Packet Detection Information (PDI), a PFCR, a QER, and a URR, some of which are not applicable to Control/User Plane Separation (CUPS):

| PCC Rule Parameter | Mapped to: |
| --- | --- |
| a rule name | The reference to activate or deactivate the corresponding PCC rule |
| service data flow filter(s) application identifier precedence | PDI(s) in the corresponding PDR(s). |
| gate status QoS parameters | The corresponding QER(s) |
| service identifier charging key (i.e., rating group) other charging parameters monitoring key sponsor identity application service provider identity | The corresponding URR(s) |
| redirect traffic steering policy identifier(s) | The corresponding FAR(s) |
| indication of PS to CS session continuity | (Not applicable for CUPS) |
| indication of access network information reporting | (Not applicable for CUPS, for Netloc feature, CPF) |

Problems with Existing Solutions

There currently exist certain challenge(s), including, but not limited to, the following problems:

Problem 1. There is no protocol detail discussed at SA2 for the possible impact in PFCP to support multi-access traffic steering, traffic switching, traffic splitting (ATSSS) between 3GPP and non-3GPP accesses, for a UE/PDU Session connecting to both 3GPP and non-3GPP accesses in the 5G system. The ATSSS technology may be based on MPTCP, Multi-path QUIC, Generic Routing Encapsulation (GRE) tunneling or other technologies.

Problem 2. There is no protocol mechanism in PFCP to support activation of a Sx/N4 rule only at certain time of a day. PFCP is a protocol used between the control plane and user plane function. Those PCC rules which are required to be activated at certain time, often require that the CPF provision corresponding Packet Forwarding Control Rules, e.g., Packet Detection Rule, Forwarding Action Rule, QoS Enforcement Rule and Usage Reporting Rule. Currently the CPF has to explicitly activate such Sx/N4 rule when the event occurs (e.g., time of day) rather than delegating the activation to the UPF.

There was discussion regarding supporting such time of day mechanisms,[3] but it was proposed to not extend the Sx interfaces to support such procedures:

[3] www.3gpp.org/ftp/tsg_ct/WG4_protocollars_ex-CN4/TSGCT4_77_Spokane/Docs/C4-172225.zip Begin Excerpt TS 23.203 and 29.212 specify requirements for support of:

Time of the day procedures, i.e. to activate/deactivate of PCC rules at a specific time of day, without PCC interaction at that point in time (see subclause 4.1 of TS 23.203 and subclause 4.5.13 of TS 29.212);

Provisioning and enforcement of time conditioned policy information, i.e. to request the PCEF to change the authorized QoS per APN and/or the authorized default EPS bearer QoS at an execution time provided by the PCRF without interaction with the PCRF (see subclause 6.4b of TS 23.203 and subclause 4.5.5.12 of TS 29.212).

TS 29.244 contains the following editor's note:

Editor's Note: It is FFS whether extensions need to be considered to support the Time of the day procedure specified in 3GPP TS 23.203 and 3GPP TS 29.212 without causing signalling storms over the Sx reference points.

It is proposed to not introduce any extension over Sx for these procedures for the following reasons:

Changing the authorized QoS per APN or the authorized default EPS bearer QoS requires the PGW to signal corresponding changes to the UE. Stage 2 and stage 3 require the PCRF to spread the times at which changes are applied for different UEs to avoid causing signalling storms in the EPS. As a result, the signalling load will also be spread for any required Sx sessions modifications.

The PCRF may provide conditions for applying the changes such as a list of RAT-Types and/or a list of IP-CAN types. These conditions have to be evaluated at their execution time. The UP function cannot evaluate these conditions. Thus such changes cannot be provisioned in advance in the UP function.

The motivation of these procedures is to avoid signalling storms over Gx (where one single PCRF can interface multiple PGWs and handle a large number of UEs). Thanks to the spread in time of the execution times, and because these changes will result in signalling over a larger number of (PGW-C, PGW-U) pairs, the resulting load on a particular Sxb or Sxc interface is expected to be significantly lower.

Adding time conditioned activation/deactivation of CP instructions to the UP function would add significant complexity to the UP function.

It is therefore proposed to delete the editor's note.

End Excerpt

The result of this decision is that time of day mechanisms are not supported in the current standards.

Problem 3. There is a protocol limitation that a Packet Detection Rule can only point to one Forwarding Action Rule, see below requirement in subclause 5.2.1 of TS 29.244. This is a limitation for multi-access PDU Session scenarios where a PDU Session may be active over multiple accesses at the same time, and thus has multiple UP paths/forwarding tunnels that can be used simultaneously for the same application traffic.

Begin Excerpt

Each PDR shall contain a PDI, i.e. one or more match fields against which incoming packets are matched, and may be associated to the following rules providing the set of instructions to apply to packets matching the PDI:

one FAR, which contains instructions related to the processing of the packets as follows:

an Apply Action parameter, which indicates whether the UP function shall forward, duplicate, drop or buffer the packet with or without notifying the CP function about the arrival of a DL packet;

forwarding, buffering and/or duplicating parameters, which the UP function shall use if the Apply Action parameter requests the packets to be forwarded, buffered or duplicated respectively. These parameters may remain configured in the FAR regardless of the Apply Action parameter value, to minimize the changes to the FAR during the transitions of the UE between the idle and connected modes. The buffering parameters, when present, shall be provisioned in a BAR created at the PFCP session level and referenced by the FAR.

NOTE 1: Buffering refers here to the buffering of the packet in the UP function. The UP function is instructed to forward DL packets to the CP function when applying buffering in the CP function. See subclause 5.3.1.

TABLE 7.5.2.2-1

| Create PDR IE within PFCP Session Establishment Request | | | | | | | |
|---|---|---|---|---|---|---|---|
| Octet 1 and 2<br>Octets 3 and 4 | | Create PDR IE Type = 1(decimal)<br>Length = n | | | | | |
| Information<br>elements | P | Condition/Comment | Sxa | Appl.<br>Sxb | Sxc | N4 | IE Type |
| PDR ID | M | This IE shall uniquely identify the PDR among all the PDRs configured for that PFCP session. | X | X | X | X | PDR ID |
| Precedence | M | This IE shall indicate the PDR's precedence to be applied by the UP function among all PDRs of the PFCP session, when looking for a PDR matching an incoming packet. | — | X | X | X | Precedence |

TABLE 7.5.2.2-1-continued

Create PDR IE within PFCP Session Establishment Request

| Octet 1 and 2 | | Create PDR IE Type = 1(decimal) | | | | | |
| Octets 3 and 4 | | Length = n | | | | | |

| Information elements | P | Condition/Comment | Appl. Sxa | Sxb | Sxc | N4 | IE Type |
|---|---|---|---|---|---|---|---|
| PDI | M | This IE shall contain the PDI against which incoming packets will be matched. See Table 7.5.2.2-2. | X | X | X | X | PDI |
| Outer Header Removal | C | This IE shall be present if the UP function is required to remove one or more outer header(s) from the packets matching this PDR. | X | X | — | X | Outer Header Removal |
| FAR ID | C | This IE shall be present if the Activate Predefined Rules IE is not included or if it is included but it does not result in activating a predefined FAR. When present this IE shall contain the FAR ID to be associated to the PDR. | X | X | X | X | FAR ID |
| URR ID | C | This IE shall be present if a measurement action shall be applied to packets matching this PDR. When present, this IE shall contain the URR IDs to be associated to the PDR. Several IEs within the same IE type may be present to represent a list of URRs to be associated to the PDR. | X | X | X | X | URR ID |
| QER ID | C | This IE shall be present if QoS enforcement action shall be applied to packets matching this PDR. When present, this IE shall contain the QER IDs to be associated to the PDR. Several IEs within the same IE type may be present to represent a list of QERs to be associated to the PDR. | — | X | X | X | QER ID |
| Activate Predefined Rules | C | This IE shall be present if Predefined Rule(s) shall be activated for this PDR. When present this IE shall contain one Predefined Rules name. Several IEs with the same IE type may be present to represent multiple "Activate Predefined Rules" names. | — | X | X | X | Activate Predefined Rules |

End Excerpt

SUMMARY

Certain aspects of the present disclosure and their embodiments may provide solutions to the aforementioned or other challenges. The present disclosure presents a generic mechanism, in EPC and 5GC for a UE which may be connected to both 3GPP and non-3GPP access, to enable a control plane function (e.g., PGW-C, SMF) to provide a set of packet forwarding control rules (e.g., a PDR or a FAR) with optional information element(s), preferably called "rule enforcement conditions", to control when and how the rules are enforced. In some embodiments, the rule enforcement conditions may contain a list of parameters that includes, but is not limited to, correlation identities (used when conditions are applicable to multiple rules, e.g., for load sharing) and time of day (e.g., used to define when the rule is activated).

There are, proposed herein, various embodiments which address one or more of the issues disclosed herein. Certain embodiments may provide one or more technical advantages, such as the ability for a CPF to provision the UPF with a set of rules, such as PDRs and FARs, to be applied during certain conditions.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Figure 1:
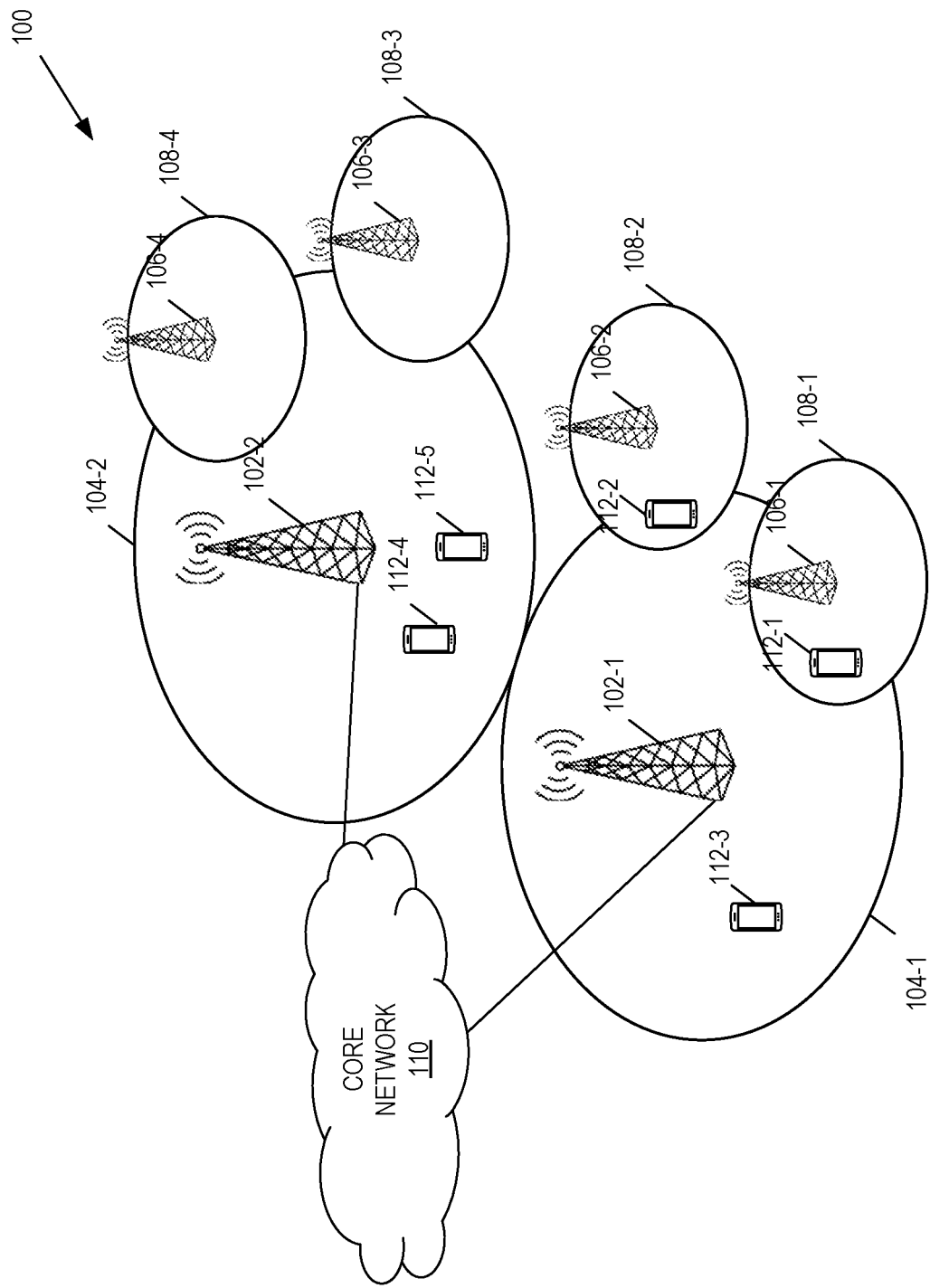
FIG. 1 illustrates one example of a cellular communications network 100 wherein some embodiments of the present disclosure can be implemented.

FIG. 1 illustrates one example of a cellular communications network 100 according to some embodiments of the present disclosure. In the embodiments described herein, the cellular communications network 100 is a 5G NR network. In this example, the cellular communications network 100 includes base stations 102-1 and 102-2, which in LTE are referred to as eNBs and in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

Figure 2:
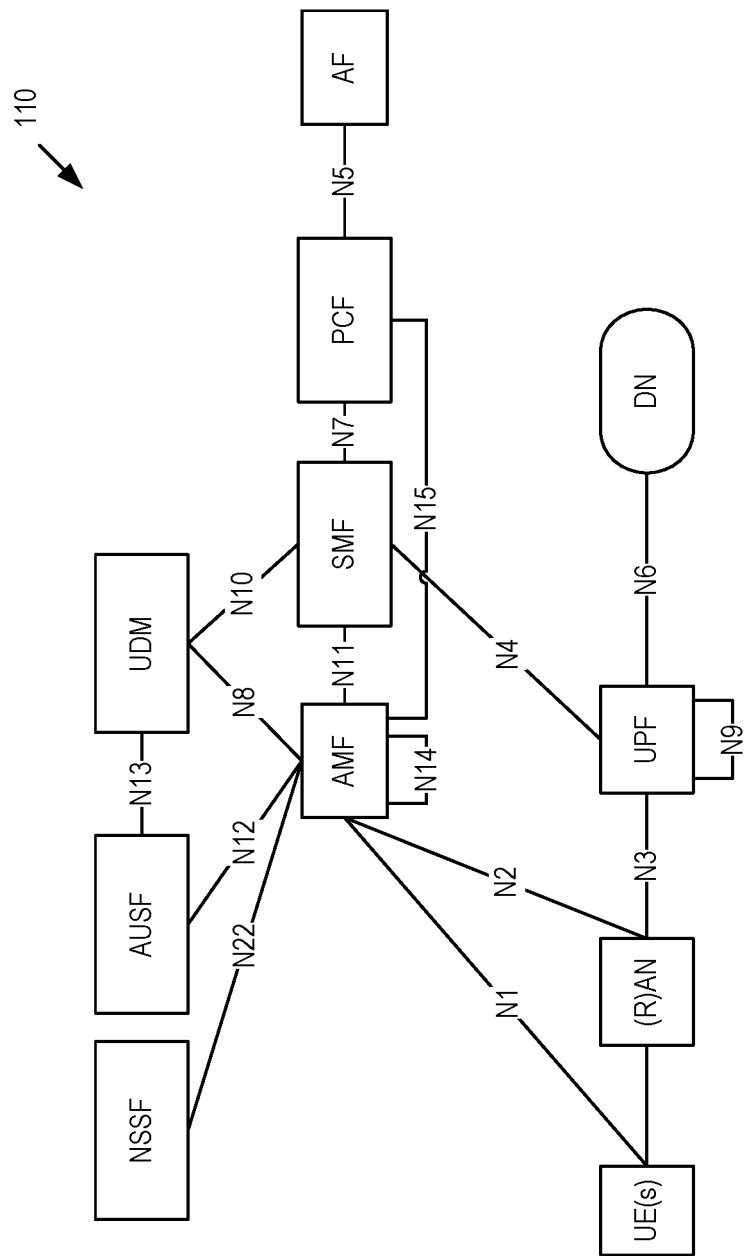
FIG. 2 illustrates a wireless communication system represented as a 5G network architecture with point-to-point reference points/interfaces between NFs.

FIG. 2 illustrates a wireless communication system represented as a 5G network architecture composed of core Network Functions (NFs), where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of User Equipment (UEs) connected to either a Radio Access Network (RAN) or an Access Network (AN) as well as an Access and Mobility Management Function (AMF). Typically, the R(AN) comprises base stations, e.g., such as evolved Node Bs (eNBs) or 5G base stations (gNBs) or similar. Seen from the core network side, the 5G core NFs shown in FIG. 2 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 2, the UPF is in the user plane and all other NFs, i.e., the AMF, SMF, PCF, AF, AUSF, and UDM, are in the control plane.

Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 3:
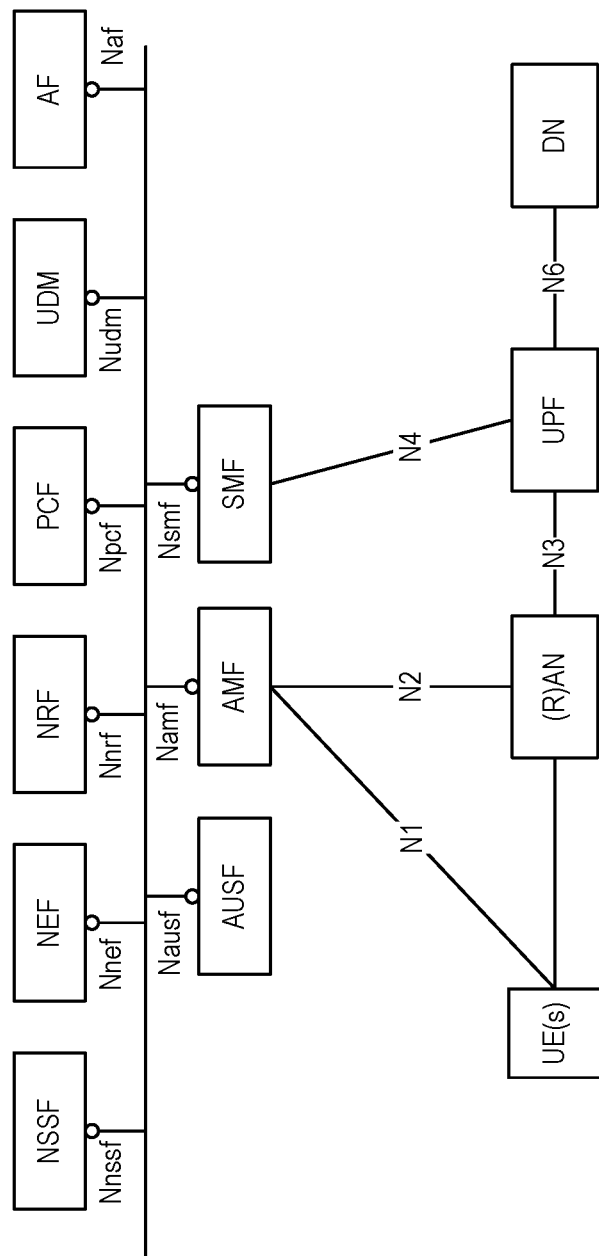
FIG. 3 illustrates a 5G network architecture using service-based interfaces between NFs in the control plane.

FIG. 3 illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g., Namf for the service based interface of the AMF and Nsmf for the service based interface of the SMF etc. The Network Exposure Function (NEF) and the Network Repository Function (NRF) in FIG. 3 are not shown in FIG. 2 discussed above. However, it should be clarified that all NFs depicted in FIG. 2 can interact with the NEF and the NRF of FIG. 3 as necessary, though not explicitly indicated in FIG. 2.

Some properties of the NFs shown in FIGS. 2 and 3 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

The present disclosure presents a generic mechanism, in EPC and 5GC for a UE which may be connected to both 3GPP and non-3GPP access, to enable a control plane function (e.g., PGW-C, SMF) to provide a set of packet forwarding control rules (e.g., a PDR or a FAR) with optional information element(s), preferably called "rule enforcement conditions", to control when and how the rules are enforced. In some embodiments, the rule enforcement conditions may contain a list of parameters that includes, but is not limited to, correlation identities (used when conditions are applicable to multiple rules, e.g., for load sharing) and time of day (e.g., used to define when the rule is activated).

The present disclosure presents several approaches by which this can be achieved on the interface between a CPF and the UPF, listed below as numbered alternatives:

Alternative 1: In this alternative, multiple correlated PDRs may be defined for the same flow or application; each PDR refers to conditions for when/how it is applied. Each PDR is associated with a single FAR, as in rel-14/15.

Alternative 2: In this alternative, a single PDR can be associated with multiple FARs for the same flow or application. The PDR (or FAR) also refers to conditions for how to select which FAR to use for a packet.

Alternative 3: In this alternative, instead of being associated to a FAR, a PDR is associated with a new kind of rule on the N4 or Sx interface that determines the traffic handling for multi-access aggregation (e.g., MPTCP). This new rule, which may be called an Aggregation Control Rule (ACR), or alternatively referred to as a Multi-Access Rule (MAR), is associated with multiple FARs for the same flow or application. The ACR also refers to conditions for how to select which FAR to use for a packet. The PDR is not associated to a FAR in this case.

Alternative 2 can be considered a variant of Alt 3 where the ACR information is included within the PDR.

Figure 4:
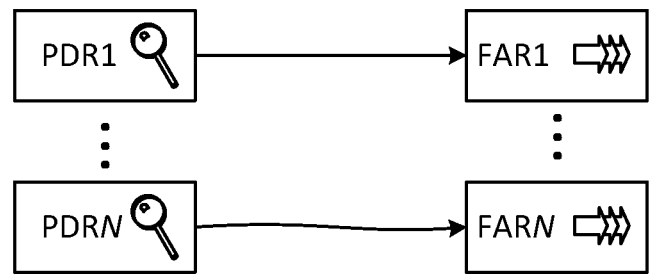
FIG. 4 is a graphic illustration of three alternatives embodiments of the present disclosure.
Figure 4:
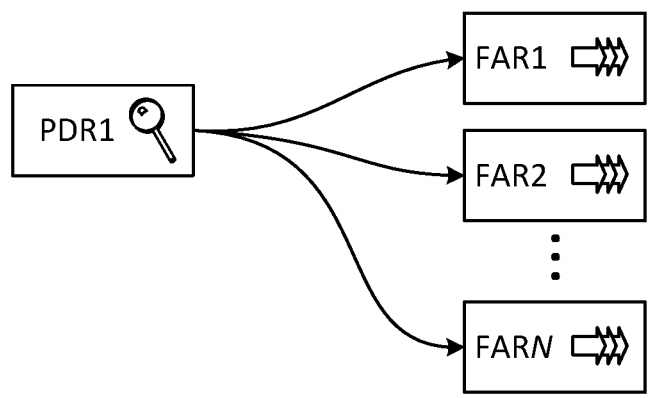
Figure 4:
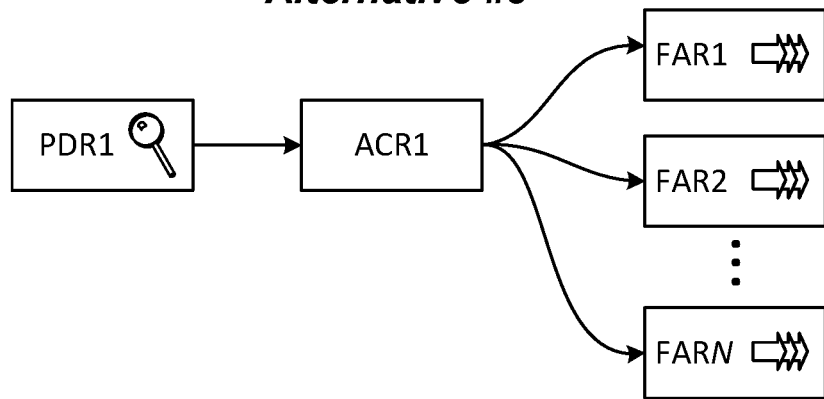

FIG. 4 contains a graphic illustration of each of the three alternatives described above.

Examples of Conditions (Assuming Single FAR per PDR as in Alt 1)

To better understand the idea, an example is presented along with several use cases. In this illustrative example, two PDRs, named PDR_100 and PDR_101, are used to match the same application traffic, e.g., YouTube; PDR_100 is linked with a FAR named FAR_100, where the packets are forwarded via 3GPP access, and PDR_101 is linked with a FAR named FAR_101, where the packets are forwarded via non-3GPP access.

Use case 1. It is desired that 80% of the YouTube traffic is sent via non-3GPP access and 20% is sent via 3GPP access. In this scenario, in one embodiment, PDR_100 will be modified by inserting a "rule enforcement condition" IE that includes a PDR correlation ID 1001 and a weight of 20, and PDR_101 will be modified by inserting a "rule enforcement condition" IE that includes a PDR correlation ID 1001 and a weight of 80, where "PDR correlation ID 1001" indicates that PDR_100 and PDR_101 are related. When a packet is matched, both PDR_100 and PDR_101 will be matched, so for every 10 packets from YouTube, 2 packets will be transferred via FAR_100 (corresponding to PDR_100) and 8 packets are transferred via FAR_101 (corresponding to PDR_101).

Use case 2. In this use case, there is no actual ratio provided for distributing the traffic over 3GPP versus over non-3GPP, but the CPF requires the UPF to do such distribution based on signaling Round Trip Time (RTT). In this scenario, PDR_100 will be modified by inserting a "rule enforcement condition" IE that includes a PDR correlation ID 1001 and a RTT over 3GPP, and PDR_101 will be modified by inserting a "rule enforcement condition" IE that includes a PDR correlation ID 1001 and a RTT over non-3GPP. Presuming for this example that RTT of 3GPP is 10 ms and RTT over non-3GPP is 40 ms, the result is that one packet will be delivered over non-3GPP for every four packets delivered over 3GPP. That is, for every five packets, four are delivered via 3GPP and one is delivered via non-3GPP. Alternatively all packets are sent over the access with shortest RTT.

Figure 5:
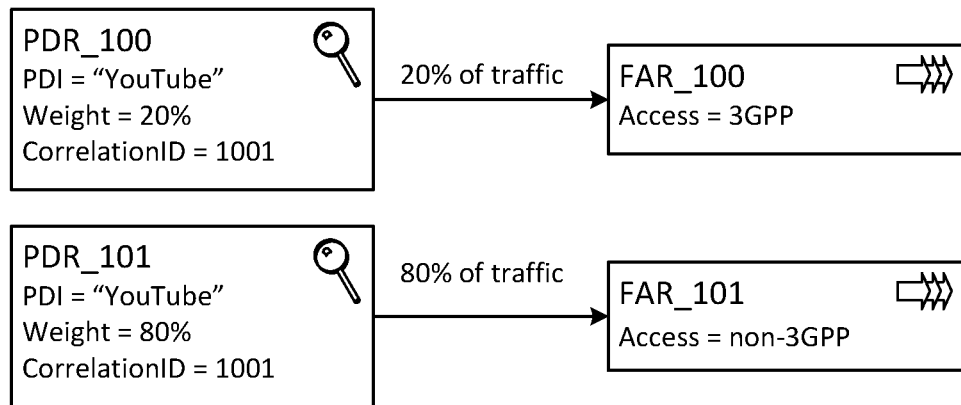
FIG. 5 is a graphic illustration of a first alternative of two example use cases.
Figure 5:
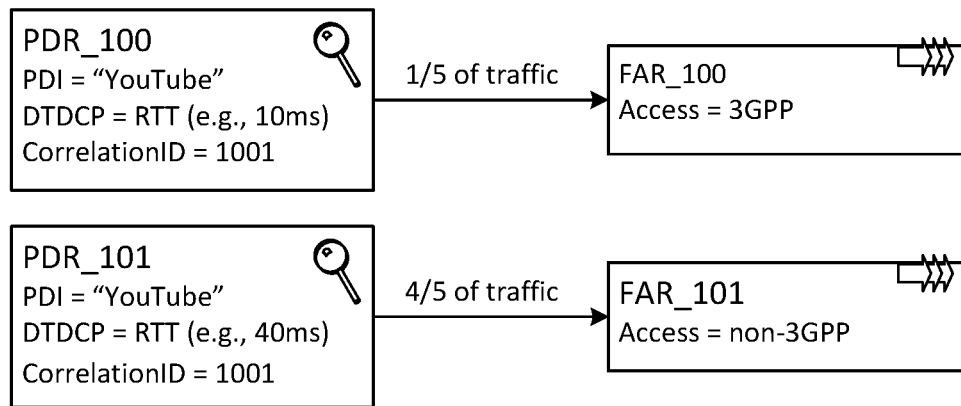

FIG. 5 contains a graphic illustration of the two Alternative 1 example use cases described above.

Alternative 1:

Multiple PDRs per Flow/Application with Single FAR in Each

If the requirement that one PDR can be matched to only one FAR is kept, the solution implies that the "rule enforcement conditions" are applied for a PDR, and include the following information:

PDR correlation identifier. This information should be unique in this PFCP session, there are multiple PDRs are linked to the same correlation ID. Those PDRs are used to match the same traffic, e.g., for the same application, there are additional parameters to control how these PDRs work together, e.g., to achieve the desired load distribution.

Weight X. This information may be present if PDR correlation identifier is present, it is a static value provisioned by CPF, used to calculate the application traffic distribution. For example, if PDR 1 has weight X, PDR 2 has Y, and PDR 3 has Z:

The PDR 1 shall deliver traffic X for every (x+y+z) packets;

The PDR 2 shall deliver traffic Y for every (x+y+z) packets;

The PDR 3 shall deliver traffic Z for every (x+y+z) packets;

Dynamic traffic distribution controlling parameter (DTDCP). This parameter may be present when PDR correction ID is present, and may be a RTT, e.g., the RTT over the path identified by the FAR. In the above example, FAR_100 is representing a path over 3GPP, so for PDR_100, if RTT (as an indication) is present, it indicates to the UPF shall calculate RTT over 3GPP. For example, if PDR 1 has RTT X, PDR 2 has Y, and PDR 3 has Z, and assuming Z is largest in the value:

The PDR 1 shall deliver Z/X, for every [(Z/X)+(Z/Y)+Z/Z)];

The PDR 1 shall deliver Z/Y for every [(Z/X)+(Z/N)+Z/Z)];

The PDR 1 shall deliver Z/Z for every [(Z/X)+(Z/Y)+Z/Z)];

Time of day for activation (TOD-A). The PDR rule is activated at certain point of time during a day or a date.

Time of day for deactivation (TOD-D). The PDR rule is deactivated at certain point of time during a day or a date.

The following is an example of how the current specification could be modified or extended to support these features according to embodiments of the present disclosure. The additions or modifications are shown in bold, italicized font.

TABLE 7.5.2.2-1

[Modified]: Create PDR IE within PFCP Session Establishment Request

Octet 1 and 2: Create PDR IE Type = 1(decimal)
Octets 3 and 4: Length = n

| Information elements | P | Condition/Comment | Sxa | Sxb | Sxc | N4 | Appl. IE Type |
|---|---|---|---|---|---|---|---|
| PDR ID | M | This IE shall uniquely identify the PDR among all the PDRs configured for that PFCP session. | X | X | X | X | PDR ID |
| Precedence | M | This IE shall indicate that PDR's precedence to be applied by the UP function among all PDRs of the PFCP session, when looking for a PDR matching an incoming packet. | — | X | X | X | Precedence |
| PDI | M | This IE shall contain the PDI against which incoming packets will be matched. See Table 7.5.2.2-2. | X | X | X | X | PDI |
| Outer Header Removal | C | This IE shall be present if the UP function is required to remove one or more outer header(s) from the packets matching this PDR. | X | X | — | X | Outer Header Removal |
| FAR ID | C | This IE shall be present if the Activate Predefined Rules IE is not included or if it is included but it does not result in activating a predefined FAR. When present this IE shall contain the FAR ID to be associated to the PDR. | X | X | X | X | FAR ID |
| URR ID | C | This IE shall be present if a measurement action shall be applied to packets matching this PDR. When present, this IE shall contain the URR IDs to be associated to the PDR. Several IEs within the same IE type may be present to represent a list of URRs to be associated to the PDR. | X | X | X | X | URR ID |
| QER ID | C | This IE shall be present if a QoS enforcement action shall be applied to packets matching this PDR. When present, this IE shall contain the QER IDs to be associated to the PDR. | — | X | X | X | QER ID |

TABLE 7.5.2.2-1-continued

[Modified]: Create PDR IE within PFCP Session Establishment Request

| Octet 1 and 2 | | Create PDR IE Type = 1(decimal) | | | | | |
| Octets 3 and 4 | | Length = n | | | | | |

| Information elements | P | Condition/Comment | Appl. Sxa | Sxb | Sxc | N4 | IE Type |
|---|---|---|---|---|---|---|---|
| Activate Predefined Rules | C | Several IEs within the same IE type may be present to represent a list of QERs to be associated to the PDR. This IE shall be present if Predefined Rule(s) shall be activated for this PDR. When present this IE shall contain one Predefined Rules name. Several IEs with the same IE type may be present to represent mulitple "Activate Predefined Rules" names. | — | X | X | X | Activate Predefined Rules |
| Rule Enforcement Conditions | O | A set of Rule enforcement conditions may be included. | | | X | X | Rule Enforcement Conditions |

[New] Table of the definition of Rule Enforcement Conditions in Create PDR IE within PFCP Session Establishment Request

| Octet 1 and 2 | | Rule EnforcementConditions IE type | | | | | |
| Octets 3 and 4 | | Length = n | | | | | |

| Information elements | P | Condition/Comment | Appl. Sxa | Sxb | Sxc | N4 | IE Type |
|---|---|---|---|---|---|---|---|
| PDR correlation ID | C | This IE shall uniquely identify the PDR among all the PDRs configured for that PFCP session. | — | X | X | X | PDR correlation ID |
| Weight | O | this information may be present if PDR correlation identifier is present, and it is used to indicate the portion of application traffic that the PDR shall match. See Note 1 | — | X | X | X | Weight |
| Dynamic traffic distribution | O | The IE may be included if any of the following indication is set to 1: RTT: this flag indicates the traffic distribution shall be based on Round trip time. See Note 2. | — | X | X | X | Dynamic traffic distribution |
| Time of day/data activation | O | | | | | | Time of day/data activation |
| Time of day/date deactivation | O | | | | | | Time of day/date deactivation |

NOTE 1: The Weight is set to 20,this indicates 20% applicationtraffic shall be matched by this PDRs, the rest will be matched by other PDRs in the PDR correlationgroup which is sharing the same PDR Correlation ID.
NOTE 2: When RTT indication is set,it indicates to the UPF that the portion of application traffic which shall be matched by the PDRis depended on the Round Trip Timeover the user plane path identified by FAR The RTT is measured by the UPF.

Alternative 2:

Single PDRs per Flow/Application Associated with Multiple FARs

If the requirement that one PDR can be linked with multiple FARs, the solution implies that the "rule enforcement conditions" can be applied for a FAR. The "weight X" and "dynamic traffic distribution controlling parameters" described above may also be applied in this alternative. Again using the example of YouTube traffic that is sent via both 3GPP and non-3GPP access, in some embodiments, one or more of the following may apply:

Only one PDR is needed to match the YouTube traffic;

Multiple FARs (e.g., FAR_100, FAR_101 in the example above) are linked to the PDR;

There is no need for a PDR correlation ID; when both FAR_100 and 101 are linked to the same PDR, they are implicitly linked;

Weight and additional dynamic traffic distribution parameter, e.g., RTT are applicable, and do the same thing as explained above; and Time of day activation/deactivation may be still applicable.

Figure 6:
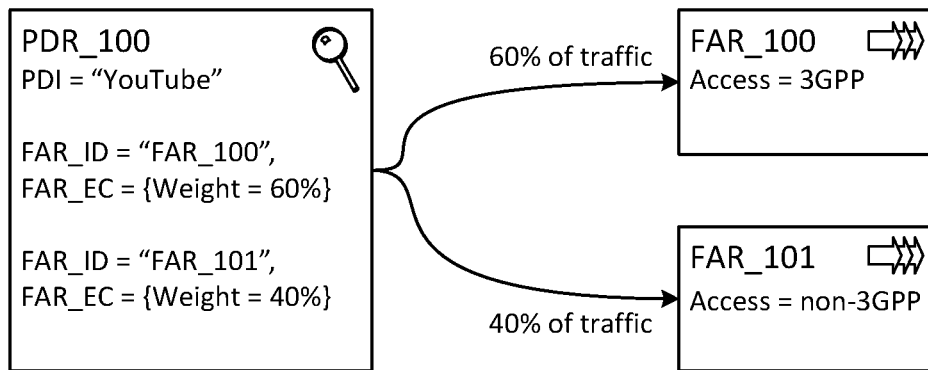
FIG. 6 is a graphic illustration of a second alternative of two example use cases.
Figure 6:
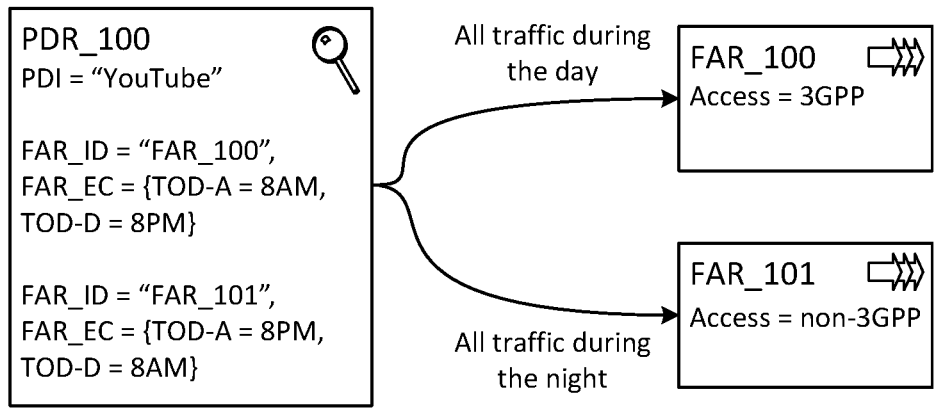

FIG. 6 contains a graphic illustration of the example of Alternative 2 described above. In a first use case, shown at the top of 6, 60% of YouTube traffic is routed through 3GPP access and 40% of YouTube traffic is routed through non-3GPP access. In a second use case, shown at the bottom of 6, YouTube traffic is routed through 3GPP access between 8 AM and 8 PM (essentially, during the day) but routed through non-3GPP access between 8 PM and 8 AM (essentially, during the night). These and other use cases are intended to be illustrative and not limiting.

To achieve load sharing among different transport network (e.g., 3GPP vs non-3GPP) for the same application traffic, some addition logic, e.g., support of Multi-Path (MP) Transmission Control Protocol (TCP), or "MPTPC", may be required. Using MPTCP can be made implementation specific, and can be represented as a forwarding policy ID together with existing requirement. In some embodiments the UPF may execute the forwarding policy before it forwards the traffic to egress.

The following is an example of how the current specification could be modified or extended to support these features according to embodiments of the present disclosure. The additions or modifications are shown in bold, italicized font.

TABLE 7.5.2.2-1

[Modified]: Create PDR IE within PFCP Session Establishment Request

| Octet 1 and 2 | | | Create PDR IE Type = 1(decimal) | | | | |
|---|---|---|---|---|---|---|---|
| Octets 3 and 4 | | | Length = n | | | | |
| Information | | | | | Appl. | | |
| elements | P | Condition/Comment | Sxa | Sxb | Sxc | N4 | IE Type |
| PDR ID | M | This IE shall uniquely identifiy the PDR among all the PDRs configured for that PFCP session. | X | X | X | X | PDR ID |
| Precedence | M | This IE shall indicate the PDR's precedence to be applied by the UP function among all PDRs of the PFCP session, when looking for a PDR matching an incoming packet. | — | X | X | X | Precedence |
| PDI | M | This IE shall contain the PDI against which incoming packets will be matched. See Table 7.5.2.2-2. | X | X | X | X | PDI |
| Outer Header Removal | C | This IE shall be present if the UP function is required to remove one or more outer header(s) from the packets matching this PDR. | X | X | — | X | Outer Header Removal |
| FAR ID | C | This IE shall be present if the Activate Predefined Rules IE is not included or if it is included but it does not result in activating a predefined FAR. When present this IE shall contain the FAR ID to be associated to the PDR. *Several IEs within the same IE type may be present to represent a list of FARs to be associated to the PDR. See NOTE X.* | X | X | X | X | FAR ID |
| URR ID | C | This IE shall be present if a measurement action shall be applied to packets matching this PDR. When present, this IE shall contain the URR IDs to be associated to the PDR. Several IEs within the same IE type may be present to represent a list of URRs to be associated to the PDR. | X | X | X | X | URR ID |
| *FAR Enforcement Conditions* | *O* | *A set of Rule enforcement conditions may be included to describe how FARs are used when there are multiple FARs are included.* | | | *X* | *X* | *Rule Enforcement Conditions* |
| QER ID | C | This IE shall be present if a QoS enforcement action shall be applied to packets matching this PDR. When present, this IE shall contain the QER IDs to be associated to the PDR. Several IEs within the same IE type may be present to represent a list of QERs to be associated to the PDR. | — | X | X | X | QER ID |
| Activate Predefined Rules | C | This IE shall be present if Predefined Rule(s) shall be activated for this PDR. When present this IE shall contain one Predefined Rules name. Several IEs with the same IE type may be present to represent multiple "Activate Predefined Rules" names. | — | X | X | X | Activate Predefined Rules |

*NOTE X: A FAR enforcement condition IE can also be included in a Create FAR IE.*

| | | | | | Appl. | | | |
|---|---|---|---|---|---|---|---|---|
| \[New\] Table of the definition of Rule Enforcement Conditions in Create PDR IE within PFCP Session Establishment Request | | | | | | | | |
| Octet 1 and 2<br>Octets 3 and 4 | | | FAR Rule Enforcement Conditions IE type<br>Length = n | | | | | |
| Information elements | P | Condition / Comment | Sxa | Sxb | Sxc | N4 | IE Type | |
| FAR ID Weight | O | this information may be present to indicate the portion of application traffic that the PDR match is forwarded by the FAR. See Note 1: | — | X | X | X | FAR ID Weight | |
| Dynamic traffic distribution | O | The IE may be included if any of the following indication is set to 1:<br>*RTT: this flag indicates the traffic distribution shall be based on Round trip time. See Note 2.* | — | X | X | X | Dynamic traffic distribution | |
| Time of day/data activation | O | | | | | | Time of day/data activation | |
| Time of day/date deactivation | O | | | | | | Time of day/date deactivation | |

NOTE 1: The Weight is set to 20, this indicates 20% application traffic which are matched by this PDR is forwarded by the FAR, the rest will be matched by other FAR linked to the PDR.
NOTE 2: When RTT indication is set, it indicates to the UPF that the portion of application traffic to be forwarded by the FAR is depended on the Round Trip Time over on the Round Trip Time over the user plane path identified by the FAR The RTT is measured by the UPF.

Alternative 3:

Single PDRs per Flow/Application Associated with New Rule (ACR) that in turn is Associated with Multiple FARs The solution implies that the "rule enforcement conditions" are applied in a new rule, here called an Aggregation Control Rule (ACR). The "weight X" and "dynamic traffic distribution controlling parameters" described above may also be applied in this alternative. The rule enforcement conditions may be in an ACR and/or in each FAR. Again using the example of YouTube traffic that is sent via both 3GPP and non-3GPP access, in some embodiments, one or more of the following may apply:

Only one PDR is needed to match the YouTube traffic.
A single ACR is linked to the PDR;
Multiple FARs (e.g., FAR_100, FAR_101) are linked to the ACR;
There is no need for correlation ID, when both FAR_100 and 101 are linked to the same ACR, they are implicitly linked;
Weight and additional dynamic traffic distribution parameter, e.g., RTT are applicable, and do the same thing as explained above.

Time of day activation/deactivation may be still applicable. These conditions are included in the ACR.

Figure 7:
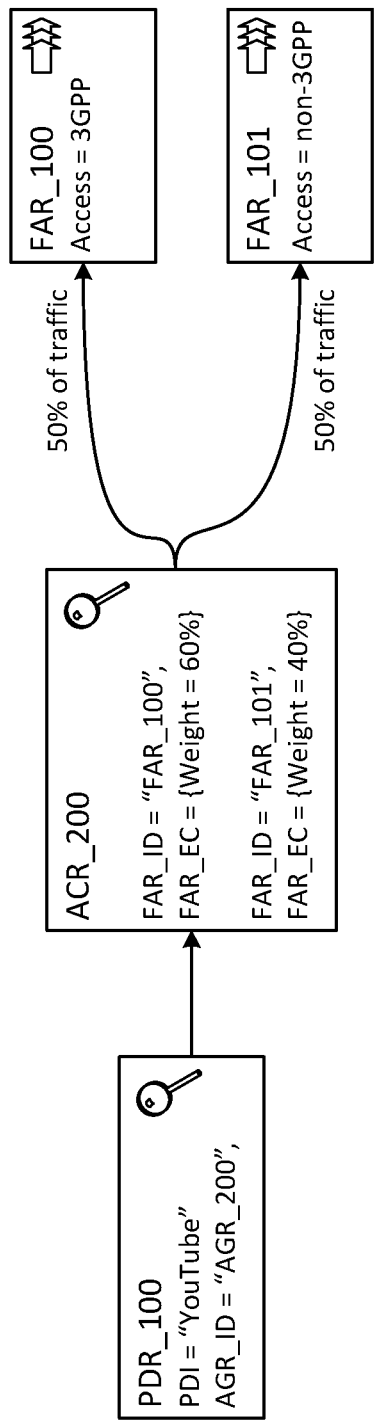
FIG. 7 is a graphic illustration of an example of a third alternative.

FIG. 7 contains a graphic illustration of the example of Alternative 3 described above. In the example illustrated in FIG. 7, PDR_100 matches YouTube traffic; ACR_200 is linked to PDR_100; and FAR_100 and FAR_101 are linked to ACR_200. ACR_200 identifies enforcement conditions (FAR_EC) for each of the linked FARs.

To achieve load sharing among different transport network (e.g., 3GPP vs non-3GPP) for the same application traffic, some addition logic, e.g., support of Multi-Path (MP) Transmission Control Protocol (TCP), or "MPTPC", may be required. Using MPTCP can be made implementation specific, and can be represented as a forwarding policy ID together with existing requirement. In some embodiments the UPF may execute the forwarding policy before it forwards the traffic to egress. Additional MPTCP related information can also be included in the ACR.

The following is an example of how the current specification could be modified or extended to support these features according to embodiments of the present disclosure. The additions or modifications are shown in bold, italicized font.

TABLE 7.5.2.2-1

| | | | | | Appl. | | | |
|---|---|---|---|---|---|---|---|---|
| \[Modified\]: Create PDR IE within PFCP Session Establishment Request | | | | | | | | |
| Octet 1 and 2<br>Octets 3 and 4 | | | Create PDR IE Type = 1(decimal)<br>Length = n | | | | | |
| Information elements | P | Condition/Comment | Sxa | Sxb | Sxc | N4 | IE Type | |
| PDR ID | M | This IE shall uniquely identify the PDR among all the PDRs configured for that PFCP session. | X | X | X | X | PDR ID | |
| Precedence | M | This IE shall indicate the PDR's precedence to be applied by the UP function among all | — | X | X | X | Precedence | |

TABLE 7.5.2.2-1-continued

[Modified]: Create PDR IE within PFCP Session Establishment Request

Octet 1 and 2: Create PDR IE Type = 1(decimal)
Octets 3 and 4: Length = n

| Information elements | P | Condition/Comment | Appl. Sxa | Sxb | Sxc | N4 | IE Type |
|---|---|---|---|---|---|---|---|
| PDI | M | PDRs of the PFCP session, when looking for a PDR matching an incoming packet. This IE shall contain the PDI against which incoming packets will be matched. See Table 7.5.2.2-2. | X | X | X | X | PDI |
| Outer Header Removal | C | This IE shall be present if the UP function is required to remove one or more outer header(s) from the packets matching this PDR. | X | X | — | X | Outer Header Removal |
| *ACR ID* | *C* | *This IE shall contain the ACR ID to be associated with the PDR* | *X* | *X* | *X* | *X* | *ACR ID* |
| URR ID | C | This IE shall be present if a measurement action shall be applied to packets matching this PDR. When present, this IE shall contain the URR IDs to be associated to the PDR. Several IEs within the same IE type may be present to represent a list of URRs to be associated to the PDR. | X | X | X | X | URR ID |
| QER ID | C | This IE shall be present if a QoS enforcement action shall be applied to packets matching this PDR. When present, this IE shall contain the QER IDs to be associated to the PDR. Several IEs within the same IE type may be present to represent a list of QERs to be associated to the PDR. | — | X | X | X | QER ID |
| Activate Predefined Rules | C | This IE shall be present if Predefined Rule(s) shall be activated for this PDR. When present this IE shall contain one Predefined Rules name. Several IEs with the same IE type may be present to represent multiple "Activate Predefined Rules" names. | — | X | X | X | Activate Predefined Rules |

NOTE X:
the execution sequence or relation between those FARs are further specified in the FAR definition.

TABLE 7.5.2.3-1

[Modified]: Create ACR IE within PFCP Session Establishment Request

Octet 1 and 2: Create ACR IE
Octets 3 and 4: Length = n

| Information elements | P | Condition/Comment | Appl. Sxa | Sxb | Sxc | N4 | IE Type |
|---|---|---|---|---|---|---|---|
| ACR ID | M | This IE shall uniquely identify the ACR among all the FARs configured for that PFCP session. | X | X | X | X | ACR ID |
| FAR ID | C | *Several IEs within the same IE type may be present to represent a list of FARs to be associated to the PDR.* See NOTE x. | X | X | X | X | FAR ID |
| *Rule Enforcement Conditions* | *O* | *A set of Rule enforcement conditions may be included. Rule conditions may be used to determine what FAR to apply for a specific traffic.* | | | *X* | *X* | *Rule Enforcement Conditions* |

NOTE 1:
The same user plane packets may be required, according to operator's policy and configuration, to be duplicated to different SX3LIFs.

| *[New] Table of the definition of Rule Enforcement Conditions in CreateFAR IE within PFCP Session Establishment Request* | | | | | | | |
|---|---|---|---|---|---|---|---|
| Octet 1 and 2 Octets 3 and 4 | | | Rule EnforcementConditions IE type Length = n | | | | |
| Information | | | | Appl. | | | |
| elements | P | Condition/Comment | Sxa | Sxb | Sxc | N4 | IE Type |
| Weight | O | This information may be present to indicate the portion of applicationtraffic that the PDR match is forwarded by a specific FAR in the ACR. See NOTE 1. | — | X | X | X | Weight |
| Dynamic traffic distribution | O | The IE may be includedif any of the following indication is set to 1: RTT: this flag indicatesthe traffic distribution shall be based onRound trip time | — | X | X | X | Dynamic traffic distribution |
| Time of day/data activation | O | | | | | | Time of day/data activation |
| Time of day/date deactivation | O | | | | | | Time of day/date deactivation |

Figure 8:
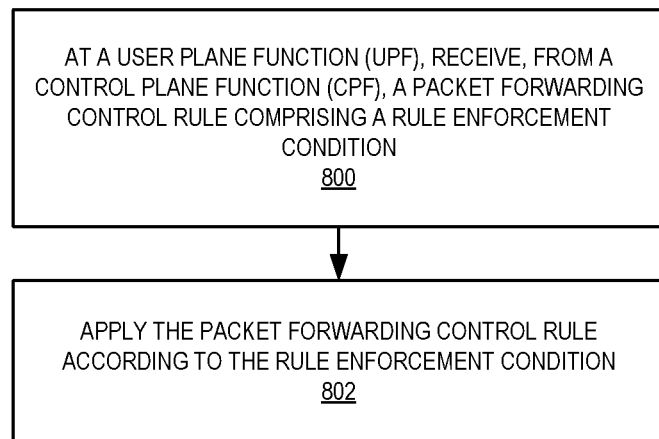
FIG. 8 is a flow chart illustrating an implementation of conditional packet forwarding rules according to some embodiments of the present disclosure.

FIG. 8 is a flow chart illustrating a process for implementing conditional packet forwarding rules according to some embodiments of the present disclosure. In the embodiment illustrated in FIG. 5, the method includes the following steps:

Step 800: at a UPF, receive, from a CPF, a packet forwarding control rule comprising a rule enforcement condition.

The packet forwarding control rule may be received in a Session Establishment Request, e.g. a PFCP Session Establishment Request. The packet forwarding control rule may be received from an Evolved Packet Core, EPC, or from a Fifth Generation Core, 5GC, control plane node. Preferably, the rule enforcement condition comprises a condition that controls when or how the packet forwarding control rule is enforced or not enforced. Preferably, the packet forwarding control rule comprises at least one Packet Detection Ruel (PDR) and/or at least one Multi-Access Rule (MAR) and/or at least one Forward Action Rule (FAR). The MAR may alternatively be referred to as an Aggregation Control Rule (ACR). Preferably, the MAR points to and/or is associated with two FARs where one FAR is applicable for 3GPP access and the other FAR is applicable for Non-3GPP access. Preferably, the PDR identifies at least one MAR. Preferably, a PDR that identifies at least one MAR does not identify any FAR. Preferably, the MAR identifies a rule enforcement condition that controls when or how the FARs are enforced or not enforced.

Step 802: the UPF applies the packet forwarding control rule according to the rule enforcement condition.

Figure 9:
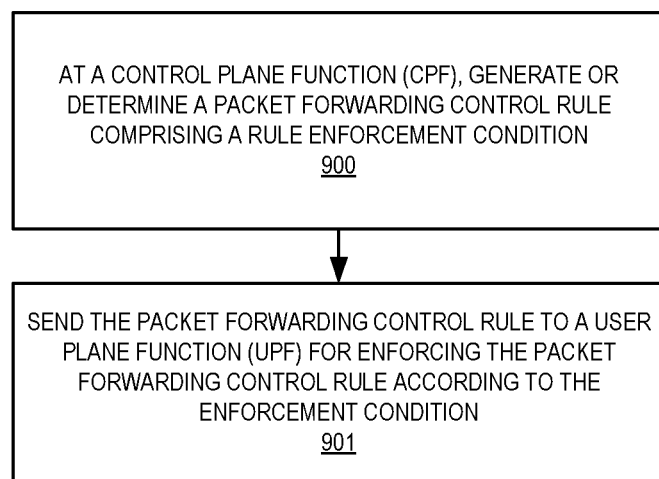
FIG. 9 is a flow chart illustrating an implementation of conditional packet forwarding rules according to some other embodiments of the present disclosure.

FIG. 9 is a flow chart illustrating a process for implementing conditional packet forwarding rules according to some embodiments of the present disclosure. In the embodiment illustrated in FIG. 6, the method includes the following steps:

Step 900: at a CPF, generate or determine a packet forwarding control rule comprising a rule enforcement condition.

Step 902: the CPF sends the packet forwarding control rule to a UPF for enforcing the packet forwarding control rule according to the enforcement condition. The packet forwarding control rule may be sent in a Session Establishment Request, e.g. a PFCP Session Establishment Request.

The packet forwarding control rule may be sent to an Evolved Packet Core, EPC, or to a Fifth Generation Core, 5GC, user plane node. Preferably, the rule enforcement condition comprises a condition that controls when or how the packet forwarding control rule is enforced or not enforced. Preferably, the packet forwarding control rule comprises at least one Packet Detection Ruel (PDR) and/or at least one Multi-Access Rule (MAR) and/or at least one Forward Action Rule (FAR). The MAR may alternatively be referred to as an Aggregation Control Rule (ACR). Preferably, the MAR points to and/or is associated with two FARs where one FAR is applicable for 3GPP access and the other FAR is applicable for Non-3GPP access. Preferably, the PDR identifies at least one MAR. Preferably, a PDR that identifies at least one MAR does not identify any FAR. Preferably, the MAR identifies a rule enforcement condition that controls when or how the FARs are enforced or not enforced.

Figure 10:
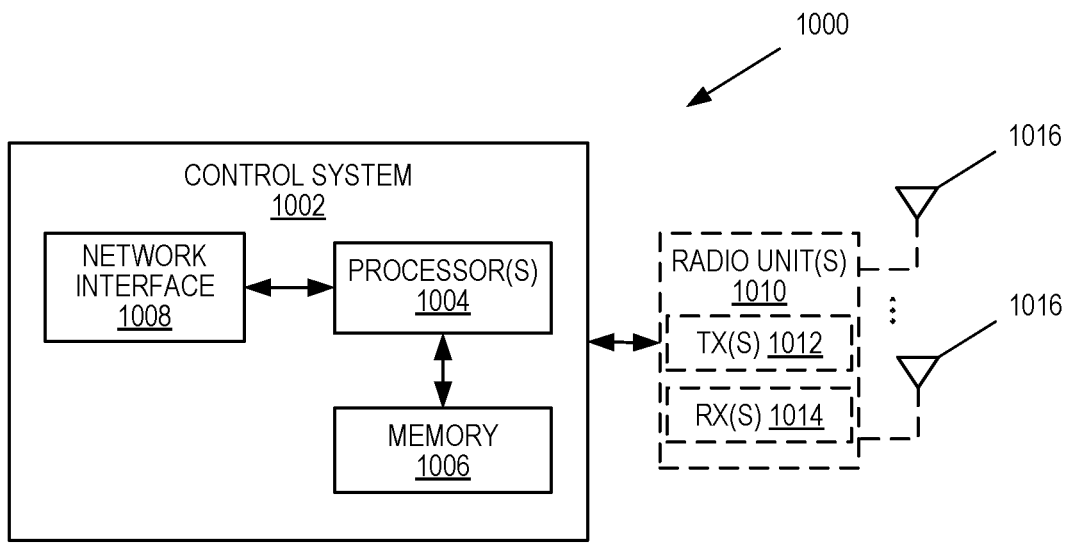
FIG. 10 is a schematic block diagram of a network node 1000 according to some embodiments of the present disclosure.
Figure 12:
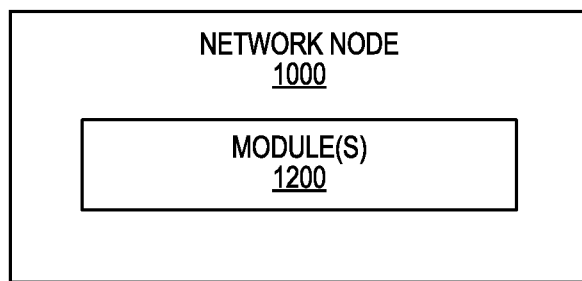
FIG. 12 is a schematic block diagram of the network node 1000 of FIG. 10 according to some other embodiments of the present disclosure.

FIG. 10 is a schematic block diagram of a network node 1000 according to some embodiments of the present disclosure. The network node 1000 may be, for example, a radio access node, such as a base station 102 or 106, or a core network node, such as a CPF or UPF. As illustrated, the network node 1000 includes a control system 1002 that includes one or more processors 1004 (e.g., Central Processing Units (CPUs), Application Specific Integrated Circuits (ASICs), Field Programmable Gate Arrays (FPGAs), and/or the like), memory 1006, and a network interface 1008. The one or more processors 1004 are also referred to herein as processing circuitry. In addition, the network node 1000 may include one or more radio units 1010 that each includes one or more transmitters 1012 and one or more receivers 1014 coupled to one or more antennas 1016. The radio units 1010 may be referred to or be part of radio interface circuitry. In some embodiments, the radio unit(s) 1010 is external to the control system 1002 and connected to the control system 1002 via, e.g., a wired connection (e.g., an optical cable). However, in some other embodiments, the radio unit(s) 1010 and potentially the antenna(s) 1016 are integrated together with the control system 1002. The one or more processors 1004 operate to provide one or more functions of a network node 1000 as described herein, including, but not limited to, the functions of a CPF or a UPF as described herein. In some embodiments, the function(s) are implemented in software that is stored, e.g., in the memory 1006 and executed by the one or more processors 1004.

Figure 11:
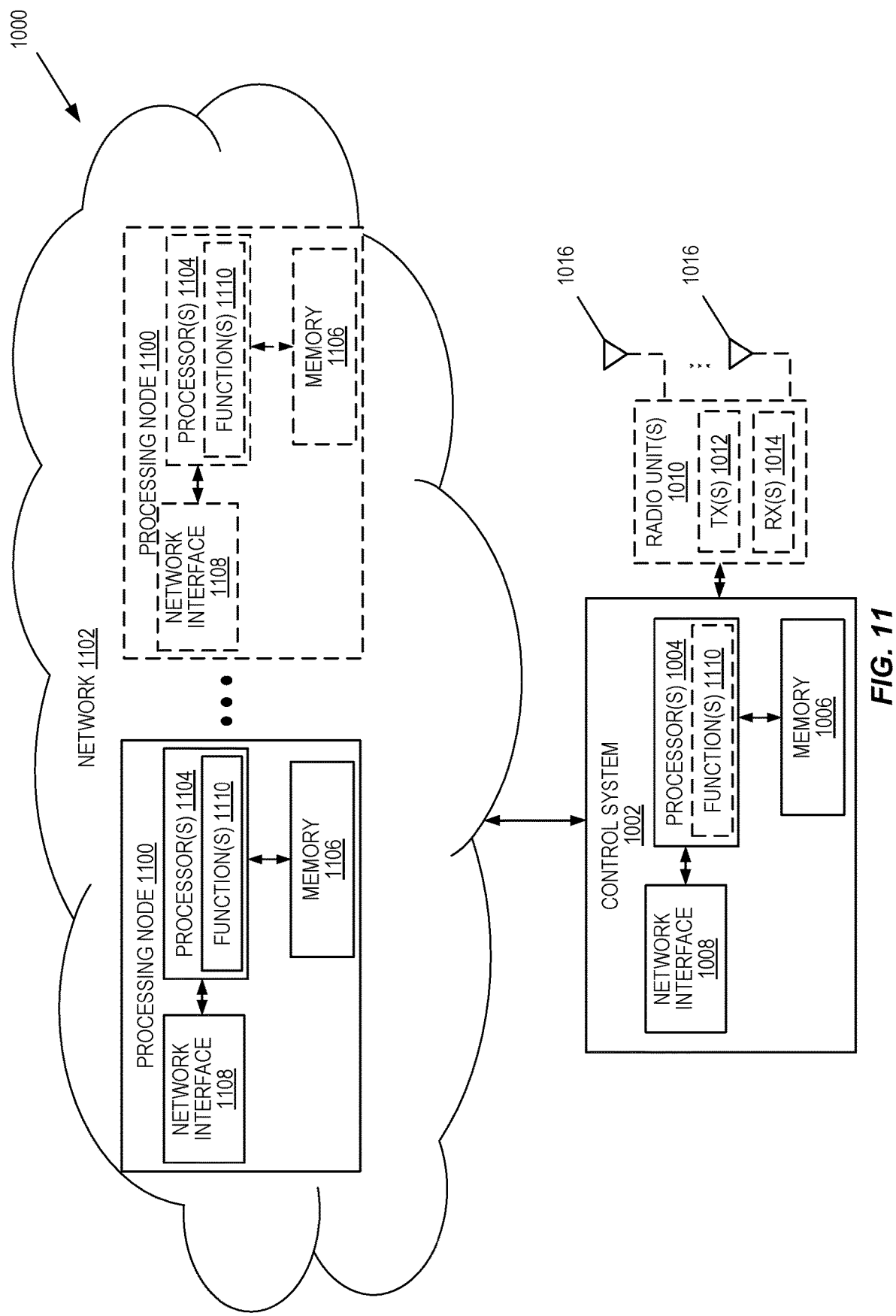
FIG. 11 is a schematic block diagram that illustrates a virtualized embodiment of the network node 1000 according to some embodiments of the present disclosure.

FIG. 11 is a schematic block diagram that illustrates a virtualized embodiment of the network node 1000 according to some embodiments of the present disclosure. This discussion is equally applicable to other types of network nodes. Further, other types of network nodes may have similar virtualized architectures.

As used herein, a "virtualized" network node is an implementation of the network node 1000 in which at least a portion of the functionality of the network node 1000 is implemented as a virtual component(s) (e.g., via a virtual machine(s) executing on a physical processing node(s) in a network(s)). As illustrated, in this example, the network node 1000 includes the control system 1002 that includes the one or more processors 1004 (e.g., CPUs, ASICs, FPGAs, and/or the like), the memory 1006, and the network interface 1008. Where the network node is a radio node, the network node 1000 may include the one or more radio units 1010 that each includes the one or more transmitters 1012 and the one or more receivers 1014 coupled to the one or more antennas 1016, as described above. The control system 1002 is connected to the radio unit(s) 1010 via, for example, an optical cable or the like. The control system 1002 is connected to one or more processing nodes 1100 (e.g. a Network Nodes) coupled to or included as part of a network(s) 1102 via the network interface 1008. Each processing node 1100 includes one or more processors 1104 (e.g., CPUs, ASICs, FPGAs, and/or the like), memory 1106, and a network interface 1108.

In this example, functions 1110 of the network node 1000 described herein are implemented at the one or more processing nodes 1100 or distributed across the control system 1002 and the one or more processing nodes 1100 in any desired manner. In some particular embodiments, some or all of the functions 1110 of the network node 1000 described herein are implemented as virtual components executed by one or more virtual machines implemented in a virtual environment(s) hosted by the processing node(s) 1100. As will be appreciated by one of ordinary skill in the art, additional signaling or communication between the processing node(s) 1100 and the control system 1002 is used in order to carry out at least some of the desired functions 1110. Notably, in some embodiments, the control system 1002 may not be included, in which case the radio unit(s) 1010 communicate directly with the processing node(s) 1100 via an appropriate network interface(s).

In some embodiments, a computer program including instructions which, when executed by at least one processor, causes the at least one processor to carry out the functionality of network node 1000 or a node (e.g., a processing node 1100) implementing one or more of the functions 1110 of the network node 1000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some embodiments may be summarized in the following manner

Group A Embodiments—UPF

===General===

1. A method for implementing conditional packet forwarding control rules, performed by User Plane Function, UPF or similar, the method comprising:

receiving, from a Control Plane Function, CPF, (e.g. in a PFCP Session Establishment Request, e.g. from a SMF via a N4 interface) a packet forwarding control rule comprising one or more rule enforcement conditions; and applying the packet forwarding control rule according to the rule enforcement condition(s).

2. The method of embodiment 1 wherein receiving the packet forwarding control rule from the CPF comprises receiving the packet forwarding control rule from an Evolved Packet Core, EPC, or Fifth Generation Core, 5GC, control plane node.

3. The method of embodiment 1 or 2 wherein receiving a packet forwarding rule comprising a rule enforcement condition comprises receiving a packet forwarding control rule comprising a condition that controls when or how the packet forwarding control rule is enforced or not enforced.

===PDR===

4. The method of any of embodiments 1-3 wherein receiving the packet forwarding control rule comprises receiving a Packet Detection Rule, PDR.

5. The method of embodiment 4 wherein the PDR comprises at least one of:

a name or identifier of the PDR;

a traffic type or source identifier;

a PDR correlation ID;

a weight parameter;

a dynamic traffic distribution parameter;

a time and/or date of activation of the PDR; and a time and/or date of deactivation of the PDR.

6. The method of embodiment 4 or 5 wherein the PDR identifies a Multi-Access Rule, MAR associated with multiple Forward Action Rules, FARs, e.g. such that the MAR points to two FARs that are applicable for 3GPP access and Non-3GPP access respectively.

===FAR===
7. The method of any of embodiments 1-6 wherein receiving the packet forwarding control rule comprises receiving a Forwarding Action Rule, FAR.
8. The method of embodiment 7 wherein the FAR comprises at least one of:
    a name or identifier of the FAR;
    a weight parameter;
    a dynamic traffic distribution parameter;
    a time and/or date of activation of the FAR; and
    a time and/or date of deactivation of the FAR.
===MAR===
9. The method of any of embodiments 1-8 wherein receiving the packet forwarding control rule comprises receiving a Multi-Access Rule, MAR, associated with multiple Forward Action Rules, FARs.
10. The method of embodiment 9 wherein the MAR comprises at least one of:
    a name or identifier of the MAR;
    a weight parameter; and
    a dynamic traffic distribution parameter.
11. The method of embodiment 9 or 10 wherein the MAR identifies one or more Forwarding Action Rule(s), FAR.
12. The method of embodiment 11 wherein the MAR identifies a rule enforcement condition that controls when or how the FARs are enforced or not enforced.
13. The method of embodiment 12 wherein the rule enforcement condition that controls when or how the FAR is enforced or not enforced comprises at least one of:
    a time and/or date of activation of the FAR; and
    a time and/or date of deactivation of the FAR.
===Example Rule Enforcement Conditions===
14. The method of any of embodiments 1-14 wherein receiving a packet forwarding rule comprising a rule enforcement condition comprises receiving a packet forwarding rule comprising at least one of:
    a weight;
    a dynamic traffic distribution indication, condition, or instruction;
    a time and/or date of activation of the rule; and
    a time and/or date of deactivation of the rule.
Group B Embodiments—CPF
===General===
15. A method for implementing conditional packet forwarding control rules, performed by Control Plane Function, CPF, (e.g., a SMF or similar) the method comprising:
    generating or determining a packet forwarding control rule comprising a rule enforcement condition; and
    sending (e.g. in a PFCP Session Establishment Request) the packet forwarding control rule to a User Plane Function, UPF, or similar for enforcing the packet forwarding control rule according to the rule enforcement condition.
16. The method of embodiment 15 wherein sending the packet forwarding control rule from the CPF comprises sending the packet forwarding control rule from an Evolved Packet Core, EPC, or Fifth Generation Core, SGC, control plane node.
17. The method of embodiment 15 or 16 wherein sending a packet forwarding rule comprising a rule enforcement condition comprises sending a packet forwarding control rule comprising a condition that controls when or how the packet forwarding control rule is enforced or not enforced.
===PDR===
18. The method of any of embodiments 15-17 wherein sending the packet forwarding control rule comprises sending a Packet Detection Rule, PDR.
19. The method of embodiment 18 wherein the PDR comprises at least one of:
    a name or identifier of the PDR;
    a traffic type or source identifier;
    a PDR correlation ID;
    a weight parameter;
    a dynamic traffic distribution parameter;
    a time and/or date of activation of the PDR; and
    a time and/or date of deactivation of the PDR.
20. The method of embodiment 18 or 19 wherein the PDR identifies a Multi-Access Rule, MAR, associated with multiple Forward Action Rules, FARs, e.g. such that the MAR points to two FARs that are applicable for 3GPP access and Non-3GPP access respectively.
===FAR===
21. The method of any of embodiments 15-20 wherein sending the packet forwarding control rule comprises sending a Forwarding Action Rule, FAR.
22. The method of embodiment 21 wherein the FAR comprises at least one of:
    a name or identifier of the FAR;
    a weight parameter;
    a dynamic traffic distribution parameter;
    a time and/or date of activation of the FAR; and
    a time and/or date of deactivation of the FAR.
===MAR===
23. The method of any of embodiments 15-22 wherein sending the packet forwarding control rule comprises sending Multi-Access Rule, MAR, associated with multiple Forward Action Rules, FARs.
24. The method of embodiment 23 wherein the MAR comprises at least one of:
    a name or identifier of the MAR;
    a weight parameter; and
    a dynamic traffic distribution parameter.
25. The method of embodiment 23 or 24 wherein the MAR identifies a Forwarding Action Rule, FAR.
26. The method of embodiment 25 wherein the MAR identifies a rule enforcement condition that controls when or how the FARs are enforced or not enforced.
27. The method of embodiment 26 wherein the rule enforcement condition that controls when or how the FAR is enforced or not enforced comprises at least one of:
    a time and/or date of activation of the FAR; and
    a time and/or date of deactivation of the FAR.
===Example Rule Enforcement Conditions===
28. The method of any of embodiments 15-27 wherein sending a packet forwarding rule comprising a rule enforcement condition comprises sending a packet forwarding rule comprising at least one of:
    a weight;
    a dynamic traffic distribution indication, condition, or instruction;
    a time and/or date of activation of the rule; and
    a time and/or date of deactivation of the rule.
Group C Embodiments
29. A User Plane Function, UPF, comprising:
    processing circuitry configured to perform any of the steps of any of the Group A embodiments; and
    power supply circuitry configured to supply power to the UPF.
30. A Control Plane Function, CPF, comprising:
    processing circuitry configured to perform any of the steps of any of the Group B embodiments; and
    power supply circuitry configured to supply power to the CPF.

31. The CPF of embodiment 30, wherein the CPF comprises an Evolved Packet Core, EPC, or Fifth Generation Core, 5GC, control plane node.
32. The CPF of embodiment 31 wherein the CPF comprises:
   a Packet Data Network Gateway, PGW; or
   a Session Management Function, SMF.

Abbreviations

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
5GC Fifth Generation Core network
AF Application Function
AMF Access and Mobility Management Function
AN Access Network
AP Access Point
APN Access Point Name
ATSSS Access Traffic Steering, Switching, or Splitting
AUSF Authentication Server Function
CP Control Plane
CPF Control Plane Function
CPU Central Processing Unit
CS Circuit Switched (subsystem)
CSI Channel State Information
CUPS Control/User Plane Separation
DL Downlink
DN Data Network
eNB Enhanced or Evolved Node B
EPC Evolved Packet Core
EPS Evolved Packet System
E-UTRA Evolved Universal Terrestrial Radio Access
FAR Forwarding Action Rule
gNB New Radio Base Station
GRE Generic Routing Encapsulation
GSM Global System for Mobile Communications
ID Identifier/Identity
IE Information Element
IoT Internet of Things
IP Internet Protocol
IP-CAN Internet Protocol Connectivity Access Network
LTE Long Term Evolution
MME Mobility Management Entity
MPTCP Multi-Path Transmission Control Protocol
MTC Machine Type Communication
NEF Network Exposure Function
NF Network Function
NR New Radio
NRF Network Repository Function
NSSF Network Slice Selection Function
OTT Over-the-Top
PCC Policy and Charging Control
PCEF Policy and Charging Enforcement Function
PCF Policy Control Function
PCRF Policy and Charging Rules Function
PDI Packet Detection Information
PDR Packet Detection Rule
PDU Protocol Data Unit
PFCP Packet Forwarding Control Protocol
PFCR Packet Forwarding Control Rule
P-GW, PGW Packet Data Network Gateway
PGW-C Packet Data Network Gateway, Control Plane functions
PGW-U Packet Data Network Gateway, User Plane functions
PS Packet Switched (subsystem)
QER Quality of Service Enforcement Rule
QoS Quality of Service
QUIC Quick User Datagram Protocol Internet Connections protocol
RAM Random Access Memory
RAN Radio Access Network
RAT Radio Access Technology
RNTI Radio Network Temporary Identifier
ROM Read Only Memory
RRH Remote Radio Head
RS Reference Signal
RTT Round Trip Time
SCEF Service Capability Exposure Function
SMF Session Management Function
SX3LIF Split X3 LI Interworking Function
TCP Transmission Control Protocol
TR Technical Report
TS Technical Specification
TSG Technical Specification Group
UDM Unified Data Management
UE User Equipment
UP User Plane
UPF User Plane Function
URR Usage Reporting Rules
UTRA Universal Terrestrial Radio Access
UTRAN Universal Terrestrial Radio Access Network

The invention claimed is:

1. A User Plane Function, UPF, for implementing conditional packet forwarding control rules, the UPF comprising:
   processing circuitry configured to cause the UPF to:
      receive, from a Control Plane Function, CPF, a packet forwarding control rule comprising a Packet Detection Rule, PDR, wherein the PDR identifies a Multi-Access Rule, MAR associated with multiple Forward Action Rules, FARs, where at least one FAR is applicable for cellular access and at least one other FAR is applicable for non-cellular access; and
      apply the packet forwarding control rule according to the received PDR; and
   power supply circuitry configured to supply power to the UPF.

2. The UPF of claim 1 wherein, in order to receive the packet forwarding control rule from the CPF, the processing circuitry is further configured to cause the UPF to receive the packet forwarding control rule from an Evolved Packet Core, EPC, or Fifth Generation Core, 5GC, control plane node.

3. The UPF of claim 1 wherein the PDR comprises at least one of:
   a name or identifier of the PDR;
   a traffic type or source identifier;
   a PDR correlation ID;
   a weight parameter;
   a dynamic traffic distribution parameter;
   a time and/or date of activation of the PDR; and
   a time and/or date of deactivation of the PDR.

4. The UPF of claim 1 wherein the packet forwarding control rule comprises a Forwarding Action Rule, FAR.

5. The UPF of claim 4 wherein the FAR comprises at least one of:
   a name or identifier of the FAR;
   a weight parameter;
   a dynamic traffic distribution parameter;
   a time and/or date of activation of the FAR; and
   a time and/or date of deactivation of the FAR.

6. The UPF of claim 1 wherein the packet forwarding control rule comprises a Multi-Access Rule, MAR, associated with multiple Forward Action Rules, FARs.

7. The UPF of claim 6 wherein the MAR comprises at least one of:
   a name or identifier of the MAR;
   a weight parameter; and
   a dynamic traffic distribution parameter.

8. The UPF of claim 7 wherein the MAR identifies one or more Forwarding Action Rule(s), FAR.

9. The UPF of claim 8 wherein the MAR identifies a rule enforcement condition that controls when or how the FARs are enforced or not enforced.

10. The UPF of claim 9 wherein the rule enforcement condition that controls when or how the FAR is enforced or not enforced comprises at least one of:
   a time and/or date of activation of the FAR; and
   a time and/or date of deactivation of the FAR.

* * * * *

UNITED STATES PATENT AND TRADEMARK OFFICE
CERTIFICATE OF CORRECTION

| | |
|---|---|
| PATENT NO. | : 11,641,611 B2 |
| APPLICATION NO. | : 17/533781 |
| DATED | : May 2, 2023 |
| INVENTOR(S) | : Yang et al. |

It is certified that error appears in the above-identified patent and that said Letters Patent is hereby corrected as shown below:

In the Specification

In Column 2, Line 28, below "(CUPS):" insert -- PCC to PDI/PDR/QER/URR/FAR mapping --, therefor.

In Column 2, Line 55, delete "traffic switching, traffic splitting (ATSSS)" and insert -- switching, or splitting (ATSSS) --, therefor.

In Columns 5 & 6, Under TABLE 7.5.2.2-1-continued, Line 26, delete "if QoS" and insert -- if a QoS --, therefor.

In Column 12, Lines 17-18, delete "Z/Z)];" and insert -- (Z/Z)]; --, therefor.

In Column 12, Line 19, delete "(Z/N)" and insert -- (Z/Y) --, therefor.

In Column 12, Lines 19-20, delete "Z/Z)];" and insert -- (Z/Z)]; --, therefor.

In Column 12, Lines 21-22, delete "Z/Z)];" and insert -- (Z/Z)]; --, therefor.

In Columns 13 & 14, Line 36, delete "day/data" and insert -- day/date --, therefor.

In Columns 13 & 14, Line 36, delete "day/data" and insert -- day/date --, therefor.

In Columns 17 & 18, Line 16, delete "day/data" and insert -- day/date --, therefor.

In Columns 17 & 18, Line 16, delete "day/data" and insert -- day/date --, therefor.

In Columns 17 & 18, Line 24, delete "overon the Round Trip Time overthe" and insert -- over the --, therefor.

Signed and Sealed this
Nineteenth Day of September, 2023

Katherine Kelly Vidal
*Director of the United States Patent and Trademark Office*

In Columns 21 & 22, Line 16, delete "day/data" and insert -- day/date --, therefor.

In Columns 21 & 22, Line 16, delete "day/data" and insert -- day/date --, therefor.

In Column 21, Line 41, delete "Ruel" and insert -- Rule --, therefor.

In Column 22, Line 31, delete "Ruel" and insert -- Rule --, therefor.

In Column 25, Line 57, delete "SGC," and insert -- 5GC, --, therefor.

In Column 28, Lines 8-9, delete "Connections protocol" and insert -- Connections --, therefor.